United States Patent
Miremadi

(10) Patent No.: US 11,092,673 B2
(45) Date of Patent: *Aug. 17, 2021

(54) ROTATING LIDAR

(71) Applicant: AeroVironment, Inc., Arlington, VA (US)

(72) Inventor: Reza Miremadi, West Hills, CA (US)

(73) Assignee: AeroVironment, Inc., Arlington, VA (US)

(*) Notice: Subject to any disclaimer, the term of this patent is extended or adjusted under 35 U.S.C. 154(b) by 351 days.

This patent is subject to a terminal disclaimer.

(21) Appl. No.: 16/051,443

(22) Filed: Jul. 31, 2018

(65) Prior Publication Data

US 2019/0064325 A1 Feb. 28, 2019

Related U.S. Application Data

(63) Continuation of application No. 14/738,788, filed on Jun. 12, 2015, now Pat. No. 10,042,042.

(51) Int. Cl.
| | |
|---|---|
| *G01S 7/481* | (2006.01) |
| *G01S 7/42* | (2006.01) |
| *G01S 17/42* | (2006.01) |
| *G01S 17/66* | (2006.01) |

(52) U.S. Cl.
CPC .......... *G01S 7/4817* (2013.01); *G01S 7/4813* (2013.01); *G01S 17/42* (2013.01); *G01S 17/66* (2013.01)

(58) Field of Classification Search
CPC ...... G01S 7/4817; G01S 17/42; G01S 7/4813; G01S 17/66
See application file for complete search history.

(56) References Cited

U.S. PATENT DOCUMENTS

| | | |
|---|---|---|
| 7,148,974 B1 | 12/2006 | Schmitt et al. |
| 7,281,891 B2 | 10/2007 | Smith et al. |
| 7,911,174 B1 | 3/2011 | Howard et al. |
| (Continued) | | |

FOREIGN PATENT DOCUMENTS

| | | |
|---|---|---|
| EP | 1562055 A2 | 8/2005 |
| JP | H11-326499 A | 11/1999 |
| (Continued) | | |

OTHER PUBLICATIONS

Rule 70(2)EPC "Communication" including an Extended European Search Opinion, dated Jan. 8, 2019, for copending EP application No. EP16837429.6.

(Continued)

*Primary Examiner* — Daniel Pihulic
(74) *Attorney, Agent, or Firm* — Eric Aagard, Esq.; The Law Office of John A. Griecci

(57) ABSTRACT

A lidar system, including a base, a sensor body, and a motor having a shaft. The motor is affixed to the base, and can drive the sensor body in rotation with respect to the base. An LED device and a light sensor are each mounted upon the sensor body. A data processing device is also mounted upon the sensor body, and is programmed to produce range information based upon the sensor data. The shaft carries two slip rings. The LED, the sensor and the data processing device all receive electrical power via the two slip rings. The data processing device is configured to transmit the range information via the two slip rings using pulse width modulation.

16 Claims, 4 Drawing Sheets

(56) References Cited

U.S. PATENT DOCUMENTS

| | | |
|---|---|---|
| 7,969,558 B2 | 6/2011 | Hall |
| 8,041,225 B2 | 10/2011 | Hemmelmann et al. |
| 8,125,622 B2 | 2/2012 | Gammenthaler |
| 8,767,215 B2 | 7/2014 | Cantin et al. |
| 8,996,172 B2 | 3/2015 | Shah et al. |
| 10,042,042 B2* | 8/2018 | Miremadi ............... G01S 17/42 |
| 2002/0176138 A1 | 11/2002 | Schlanger |
| 2007/0230451 A1 | 10/2007 | Porat et al. |
| 2008/0018879 A1 | 1/2008 | Kim et al. |
| 2014/0111812 A1 | 4/2014 | Baeg et al. |
| 2014/0160460 A1 | 6/2014 | Gilliland et al. |
| 2018/0081036 A1* | 3/2018 | Miremadi ............... G01S 17/42 |
| 2019/0064325 A1* | 2/2019 | Miremadi ............ G01S 7/4817 |

FOREIGN PATENT DOCUMENTS

| | | |
|---|---|---|
| JP | 2013-505452 A | 2/2013 |
| WO | WO 2011/035290 A1 | 3/2011 |
| WO | 2017030638 A2 | 4/2017 |

OTHER PUBLICATIONS

International Search Report and Written Opinion, dated Mar. 16, 2017, for related PCT application PCT/US2016/037275.
"Notification of Reasons for Rejections" for copending Japan Application No. JP 2018-516406, dated May 20, 2020, by the JPO.

* cited by examiner

ROTATING LIDAR

The present application is a Continuation Application of U.S. patent application Ser. No. 14/738,788, filed Jun. 12, 2015, which is incorporated herein by reference for all purposes.

The present invention relates to a rotating lidar system (an illumination-based remote sensing technology for detecting objects and measuring their range), such as for use in vehicles like aircraft or automobiles.

BACKGROUND OF THE INVENTION

Present day lidar systems are typically thought of as a combination of laser technologies with existing radar-type range and direction detection systems. Commercial systems have been used for high altitude aerial 360 degree scanning of landscapes, and similar scanning operations, as their lasers offer no optical threat to scanned individuals. An important limitation to the typical laser based lidar systems is that they must limit direct exposure to an individual observer, so as to avoid burning the retinas of the observed individuals. These systems operate at great range, and thus have little need for the sensing of instantaneous changes. Amateur systems broaden this technology to less-harmful light based sensor systems that can be implemented more locally, but are limited by structural constraints that can limit the operation of the system both spatially and speed-wise.

It is also known to using other than highly concentrated laser light for lidar, it is also known to use not-laser light, such as from an LED, to operate a lidar system. As a highly local observation system, this system needs to be extremely time sensitive, as changes in local conditions can be highly active, and need to be detected extremely rapidly, and over a wide range of observation.

Existing systems, such as ones based on fixed wires or rotating mirrors, limit the range of viewing of lidar systems, typically having blind spots and/or limitations on 360 degree rotations. Moreover, past attempts to overcome these limitations are based on electro/mechanical technologies that limit bandwidth communications and the related data transfer of information that needed to be processed to calculate range and directional information to access the full potential of the lidar system.

It is understood there exists a need for improved lidar systems that operate over 360 degrees and allow for safe interactions with observed individuals, and that further provide for high scanning data rates to provide for significantly real-time observation.

SUMMARY OF THE INVENTION

In various embodiments, the present invention solves some or all of the needs mentioned above, providing a lidar device that can allow for safe interactions with observed individuals, and that further provide for high scanning data rates to provide for real-time operation of a device using the lidar for guidance.

The lidar system includes a base, a sensor body, and a motor having a stator and a rotor. The rotor has a shaft that the stator can drive in rotation. The motor is affixed to the base and sensor body such that the motor can drive the sensor body in rotation with respect to the base. An illumination device is mounted upon the sensor body, and is configured to emit illumination. A sensor is also mounted upon the sensor body, and is directed to receive illumination emitted by the illumination device and reflected back toward the sensor. A data processing device is also mounted upon the sensor body, and is programmed to produce range information based upon the sensor data.

Advantageously, the presence of the data processing device on the sensor body provides for a large amount of sensor data to be resolved down into a comparatively small amount of range data. This smaller stream of data provides for high data transmission rates from the sensor body to the base, which can be accomplished over a structurally favorable electromechanical structure.

The lidar system further features two slip rings on the shaft. The illumination device, the sensor and the data processing device all receive electrical power via the two slip rings. The data processing device is configured to transmit the range information via the two slip rings using pulse modulation. Advantageously, this electromechanical structure minimizes cost, weight, and risk of electronic or mechanical failure.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them. Furthermore, there is no intent to be bound by any expressed or implied theory presented in this application.

Figure 1:
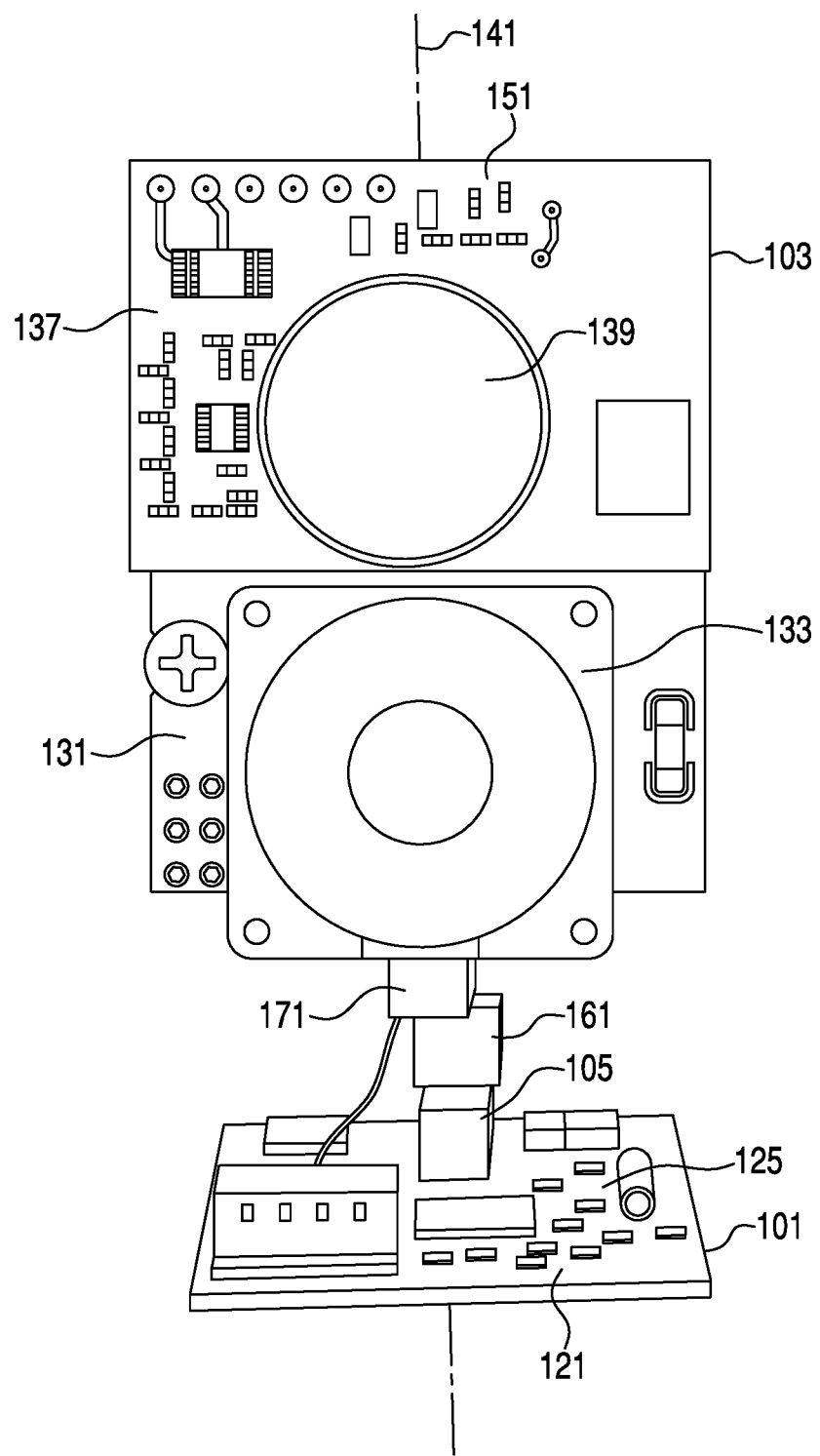
FIG. 1 is a perspective view of a lidar device embodying the present invention.
Figure 2:
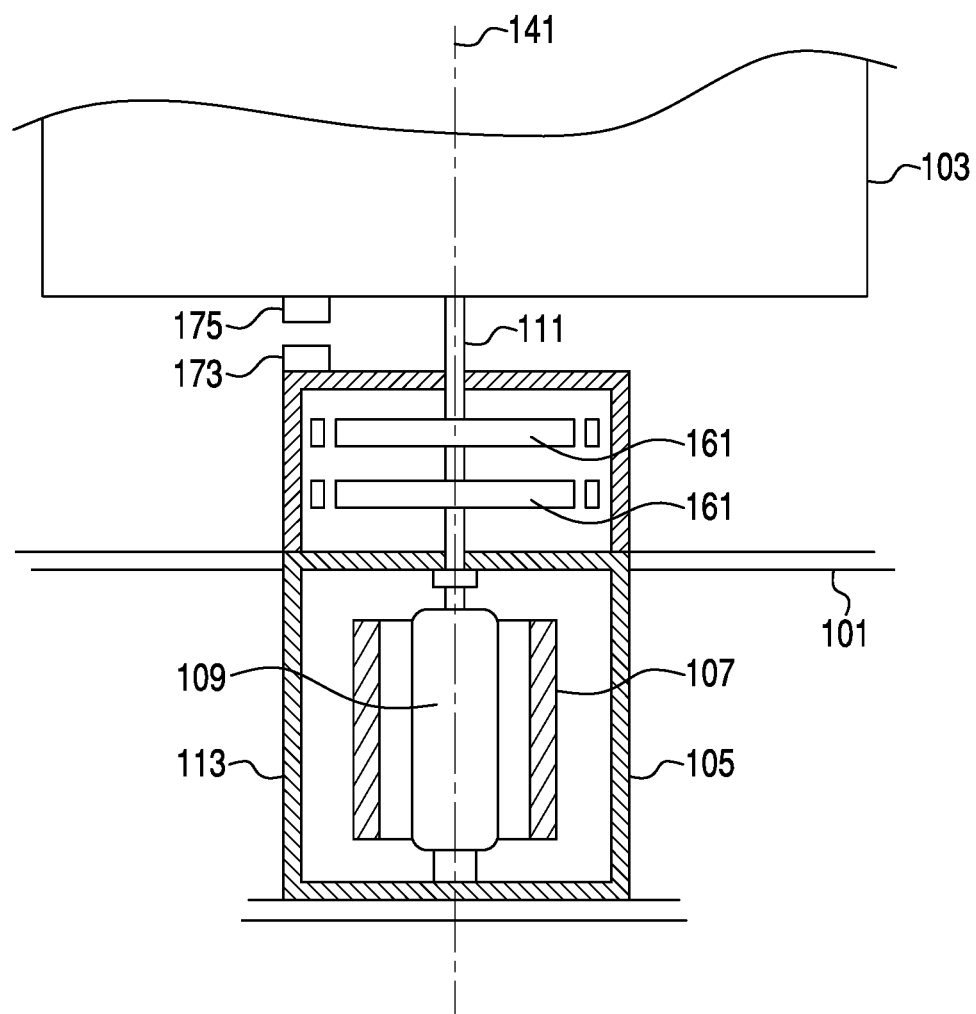
FIG. 2 is a cross-sectional front view of a portion of the lidar device depicted in FIG. 1.
Figure 3:
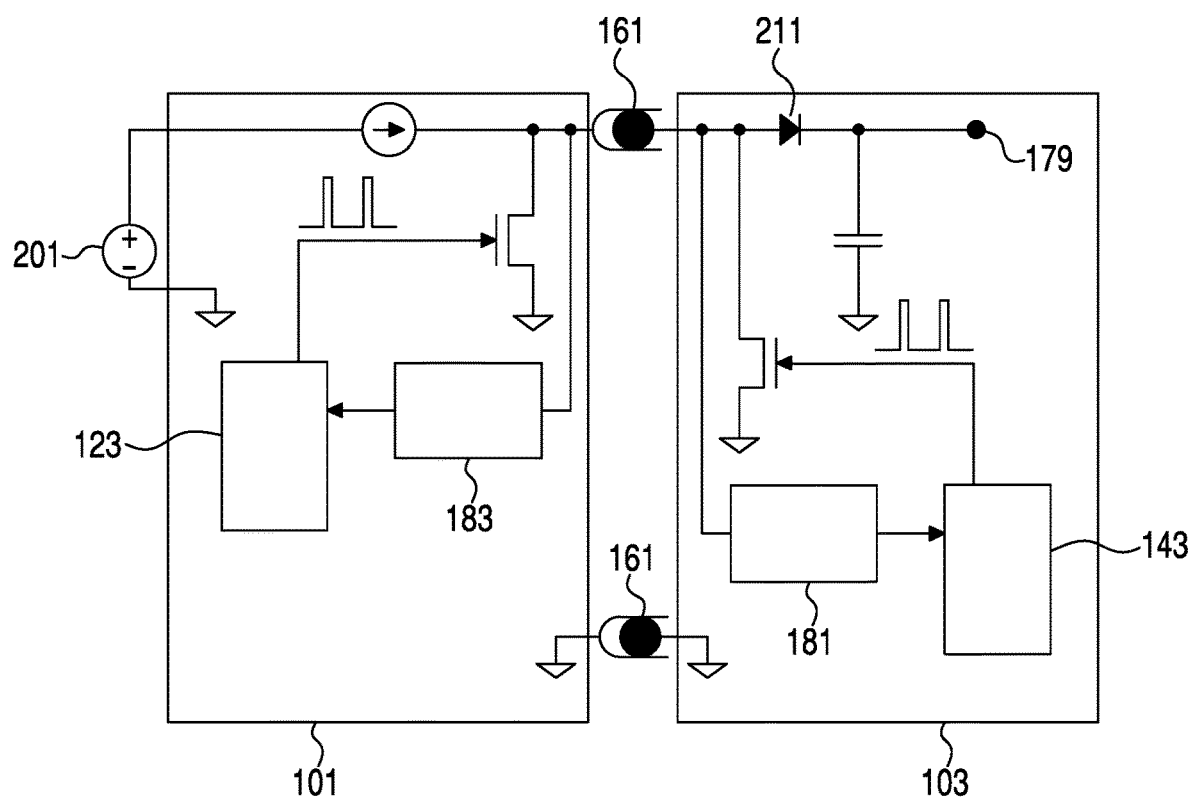
FIG. 3 is a schematic view of the electronic systems of the lidar device depicted in FIG. 1.
Figure 4:
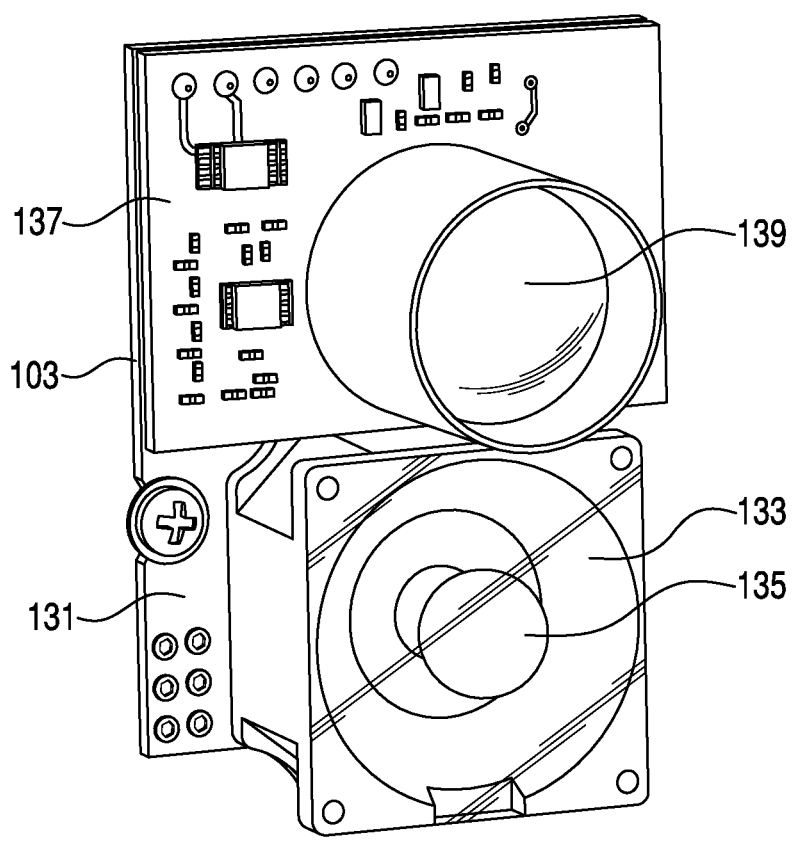
FIG. 4 is a perspective view of a portion of the lidar device depicted in FIG. 1.

With reference to FIG. 1, typical embodiments of the present invention reside in a rotating lidar system for mounting on a device that would benefit from a lidar system (not shown), such as an unmanned aerial vehicle ("UAV"). The lidar system includes a base 101, a sensor body 103, and a motor 105. The motor has a stator 107, a rotor 109, and a shaft 111 affixed to the rotor. The stator is configured to drive the rotor (and thereby the shaft) in rotation.

The motor 105 is affixed to the base 101 and sensor body 103 such that the motor can drive the sensor body in rotation with respect to the base. More particularly (though not necessarily), the stator 107 is affixed to a motor housing 113, which is in turn affixed to the base, while the shaft 111 is affixed to the sensor body.

The base 101 is configured for mounting to the device that would benefit from a lidar system, e.g., a UAV or automobile. The base includes a base printed circuit board ("Base PCB") 121 housing a microcontroller control system 123 in the form of electronic devices 125 such as a CPU and memory mounted on the Base PCB.

The sensor body 103 includes a sensor board made of a pair of sensor body PCBs ("SB PCBs") mounted offset and in parallel. A first SB PCB 131 of the pair of SB PCBs carries an illumination device 133, which is mounted upon the sensor body 103, and is configured with an LED 135 (i.e., a light emitting diode) to emit illumination at selected times. A second SB PCB 137 of the pair of SB PCBs carries a sensor 139 mounted upon the sensor body, being directed to receive illumination emitted by the illumination device and reflected back toward the sensor by an illuminated object. The sensor is further configured to emit sensor data based on the reflected, received illumination.

The illumination device 133 and sensor 139 are directed parallel to one another in a sensing direction that is normal to a rotor axis of rotation 141 that is defined by the orientation of the rotor 109 and shaft 111. The illumination device illuminates objects at which it is directed, and the sensor then receives the reflected illumination that is emitted by the illumination device and reflected back toward the sensor by the objects at which it is directed. When the motor drives the sensor body in rotation, sensor data is generated throughout the arc through which the sensing direction passes.

The sensor body 103 further includes a microcontroller data processing device 143 mounted upon the sensor body, the data processing device being programmed to reduce the sensor data to relevant information data, and more particularly, to produce range information based upon the sensor data received from the sensor. The data processing device is located on the first and/or second SB PCBs, 131, 137, and is in the form of electronic devices 151 such as a CPU and memory mounted on the SB PCBs.

The control system 123 is programmed to control the operation of the motor 105. More particularly, the control system is adapted to direct the motor in a variety of different operations. In a first operation, the control system is adapted to repeatedly rotate the rotor 109 and shaft 111 (and thus the sensing direction of the sensor body 103) 360 degrees in one rotational direction while both the illumination device 133 and the sensor 139 are operating, i.e., to continually scan for range information over 360 degrees in one rotational direction.

In a second action, the control system 123 is adapted to direct the motor 105 to fix the position rotor 109 and shaft 111, and thereby the sensing direction of the sensor body 103, in a single direction for an extended period of time while both the illumination device 133 and the sensor 139 are operating, so as to generate range information in a single sensing direction. This operation is particularly of interest when a device that would benefit from a lidar system (e.g., a UAV) affixes itself I n a single location and observes either the presence of or the distance of a single target.

In a third operation, the control system 123 is adapted to direct the motor 105 to rotate the rotor 109 and shaft 111, and thereby the sensing direction of the sensor body, back and forth in opposite rotational directions over a limited range of less than 360 degrees while both the illumination device 133 and the sensor 139 are operating. More typically in this third operation the rotor and shaft is rotated over a small range less than 90 degrees, or even less than 30 degrees, such as to watch for movement in a limited range of rotational directions.

A fourth operation of the control system 123 is the same as that of the third operation, except that the control system is further adapted to adjust the limits of the limited range of motion based upon the sensed readings so as to track and follow both the range and the direction of a sensed object, even as it may travel over a range of rotational directions far exceeding the limited range of rotational directions that are being scanned.

With a typical laser device, limited range-of-motion actions (and particularly operations that fix the illumination device in a single direction) would put observed humans and animals at significant optical risk (i.e., risk of eye damage) due to the effect a laser could have on the eyes with significant exposure. The fact that this preferred embodiment operates with an LED rather than a laser, means that the risk of optically harming the subject of observation is substantially limited or eliminated. Moreover, LED illumination is more effective in detecting glass than a laser, and is far less likely to be misled by a narrow crevice.

Of course, the use of a less focused light (e.g., an LED) results in a limited range (i.e., distance) of operation. The limit to this viewing range depends on of the illumination device 133 and the sensor 139. Preferably, the in this embodiment the illumination device is an infrared LED device, and the sensor is an infrared sensor.

To support the multiple types of operation of the system, the lidar system needs a competent rotation detection system to establish and confirm the rotational direction of the sensed information, even as the motor 105 repeatedly changes orientation. To this end, the lidar system further includes a positional sensor system including a magnet 173 separate from the motor, and a magnet index sensor 175 separate from the motor.

The motor 105 is a stepper motor, typically operating in 2 degree increments. The data processing device 143 is configured to confirm the position of the rotor with respect to the stator using the magnet 173 and the magnet index sensor 175. Thus, even though a stepper motor is generally configured to know its position relative to its last position, the magnet and magnet index sensor adjust and confirm this information each time the magnet and sensor pass one another, providing an absolute reference from which to operate. In the present embodiment, the magnet is affixed to the base 101, and the magnet index sensor is a Hall Effect magnet sensor affixed to the sensor body 103.

In prior art systems, a fundamental flaw is the conflict between the desired range of motion and the physical constraints implied by communication systems. For example, it is known to place all electrical devices (including the illumination device and sensor) on a stationary platform, and then to direct the illumination by spinning a mirror. Such devices have limitations because of blind spots caused by wiring and/or spinning structures blocking the view. In systems where an illumination device and sensor have viewing impediments, the system has a significant limitation.

Moreover, any rotating portion of the system that has electric components (like a laser) may need to be powered and controlled. Any information generated by the rotating system (e.g., sensed sensor data) must be passed back to non-rotating systems. Directly wired spinning optical systems cannot repeatedly spin 360 degrees because of the wiring. Optical systems using spinning mirrors inherently have a blind spot where the wires from the mirror control system (or the transmitter/receiver system) cross the view of the mirrors in order to put the two systems in communication.

A large number of slip rings (e.g., four or more) could be used to transfer both any power requirements of a rotating body, and to further communicate the sensed data from a sensor. Nevertheless, this type of system would lead to a significant number of failure scenarios (i.e., risk factors). Every slip ring increases not only the risk of system failure, but also to the cost and complexity of the system. Moreover, every slip ring adds additional resistance to the rotation of the rotating body, and thus affects the accuracy of the system. The present embodiment provides a better solution to this issue.

The present embodiment includes only two slip rings 161, each with two brushes, to transfer both information and power. The illumination device 133, the sensor 139 and the data processing device 143 receive electrical power via the two slip rings. Also the data processing device is configured to transmit the generated range information via the two slip rings using pulse modulation. The passage of pulse modulated data on a power line puts limits on the bandwidth that can be communicated while full power is delivered. Nevertheless, the use of only two slip rings is a viable solution because the range information generated by the data processing device 143 requires substantially less bandwidth than would be needed to directly transmit the sensed data from the sensor. Thus, the system can operate at a very high rate of range data generation while being a low power lidar system.

The lidar system receives power from a power source 201 attached to the base 101. The power from the power source is passed via the two slip rings 161 to the sensor body 103, where it is distributed where needed on the sensor body (e.g., to the illumination device 133, the sensor 139 and the data processing device 143.

The power passed through the slip rings 161 is modulated by the motor control system 123 to pass mode of operation information for use by the data processing device 143. The modulated power signal is passed via the slip rings 161 to the sensor body 103, where the power is distributed to a power bus 179.

The information in the modulated power signal is translated in a sensor body level translator 181, and then passed to the data processing device 143, providing it with the mode of operation information. The data processing device controls the operation of the illumination device 133, and sensor 139, and receives sensor data from the sensor. The data processing device also monitors the magnet index sensor 175 for positional information. The data processing devices calculates range information that corresponds with the rotational position of the sensor body 103.

The range and position information for each sensing direction is then modulated into the power signal by the data processing device 143. On the other side of the slip rings 161, a base level translator 183 translates the information and passes it to the control system 123 for external dissemination.

Thus, the slip rings allow sending power and data over two wires. The two brushes per slip ring increase the reliability of the link. The sensor body 103 places data on this line by pulling it low. This encoding is used to minimize the power loss to the sensor body. The serial data from the sensor body is encoded by an IRDA encoder and converted to narrow pulses that are superimposed on the input power. A diode 211 on the sensor body 103 isolates these pulses. On the base 101, these narrow pulses are converted to a digital pulse stream using the level transistor 181 and fed to the control system 123. The control system then converts the IRDA stream to UART serial data and sends out the packets to the device requiring a lidar device (e.g., the UAV).

There is a tradeoff between the efficient delivery of power to the rotating components and the efficient delivery of information. Nevertheless, by doing all the range information calculation on the rotating body, the amount of information to be transmitted is severely reduced, and therefore the effect on the power delivery can be extremely limited.

Advantageously, the features of this invention provide for a lidar device having a very high data capacity. For example, with over 5 sensor body 103 rotations per second, on the order of 1000 data points per second can be generated and transmitted by a lidar device weighing roughly 35 grams and requiring 1.4 W. Moreover, the data processing device 143 might not need cooling, as the rotation of the sensor body can create continuous airflow over the electronic devices 151 on the sensor body. Thus, the present embodiment provides for a lidar device that is lightweight, inexpensive, reliable, optically safe, and accurate, all while operating at high data rates.

It is to be understood that the invention comprises apparatus and methods for designing and for producing lidar devices under the present invention, as well as the apparatus and methods of the invention itself. Additionally, the various embodiments of the invention can incorporate various combinations of these features and/or other systems incorporating the described features. In short, the above disclosed features can be combined in a wide variety of configurations within the anticipated scope of the invention.

While particular forms of the invention have been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. A lidar system, comprising:
   a base;
   a sensor body;
   a motor having a stator and a rotor, the rotor having a shaft that the stator can drive in rotation, wherein the motor is affixed to the base and sensor body such that the motor can drive the sensor body in rotation with respect to the base;
   a printed circuit board on the base, the printed circuit board housing a control system that controls the operation of the motor;
   an illumination device mounted upon the sensor body and being configured to emit illumination;
   a sensor mounted upon the sensor body and directed to receive illumination emitted by the illumination device and reflected back toward the sensor, and to emit sensor data based on the received illumination; and
   a data processing device including an electronic CPU mounted upon the sensor body, the data processing device being programmed to produce range and position information based upon the sensor data.

2. The lidar system of claim 1, and further comprising a control system configured to control the operation of the motor, wherein the control system is adapted to direct the motor to repeatedly spin 360 degrees in one direction, and wherein the control system is further adapted to direct the motor to spin back and forth in opposite directions over a limited range motion of under 360 degrees.

3. The lidar system of claim 2, wherein the control system is further adapted to adjust the limits of the limited range of motion based upon the range information so as to track a sensed object.

4. The lidar system of claim 2, wherein the illumination device is an infrared LED device, and wherein the sensor is an infrared sensor.

5. The lidar system of claim 1, and further comprising a control system configured to control the operation of the motor, wherein the control system is adapted to direct the motor to repeatedly spin 360 degrees in one direction, and wherein the control system is further adapted to direct the motor to fix the rotor in a single direction for an extended period of time while both the illumination device and the sensor are operating.

6. The lidar system of claim 5, wherein the illumination device is an infrared LED device, and wherein the sensor is an infrared sensor.

7. The lidar system of claim 1, wherein:
the shaft includes two disk-shaped slip rings;
the illumination device, the sensor and the data processing device receive an electrical power signal via the two disk-shaped slip rings; and
the data processing device is configured to modulate the power signal to transmit the range and position information via the two disk-shaped slip rings.

8. The lidar system of claim 7, wherein the data processing device is further configured to transmit the range and position information via the two slip rings using pulse width modulation and an IRDA protocol.

9. A lidar system, comprising:
a base;
a sensor body;
a motor having a stator and a rotor, the rotor having a shaft that the stator can drive in rotation, wherein the motor is affixed to the base and sensor body such that the motor can drive the sensor body in rotation with respect to the base;
a printed circuit board on the base, the printed circuit board housing a control system that controls the operation of the motor;
an illumination device mounted upon the sensor body and being configured to emit illumination;
a sensor mounted upon the sensor body and directed to receive illumination emitted by the illumination device and reflected back toward the sensor, and to emit sensor data based on the received illumination; and
a data processing device including an electronic CPU mounted upon the sensor body, the data processing device being programmed to reduce the sensor data to relevant information data including range and position information data;
wherein the shaft includes two slip rings;
wherein the illumination device, the sensor and the data processing device receive electrical power via the two slip rings; and
wherein the data processing device is configured to transmit the relevant information data via the two slip rings.

10. The lidar system of claim 9, wherein the data processing device is further configured to transmit the relevant information data via the two slip rings using pulse width modulation.

11. The lidar system of claim 9, wherein the data processing device is further configured to transmit the relevant information data via the two slip rings using pulse width modulation and an IRDA protocol.

12. The lidar system of claim 9, and further comprising a control system configured to control the operation of the motor, wherein the control system is adapted to direct the motor to repeatedly spin 360 degrees in one direction, and wherein the control system is configured to direct the motor to spin back and forth in opposite directions over a range of motion under 360 degrees.

13. The lidar system of claim 12, wherein the control system is further adapted to adjust the limits of the limited range of motion based upon the relevant information data so as to track a sensed object.

14. The lidar system of claim 12, wherein the illumination device is an infrared LED device, and wherein the sensor is an infrared sensor.

15. The lidar system of claim 9, and further comprising a control system configured to control the operation of the motor, wherein the control system is adapted to direct the motor to repeatedly spin 360 degrees in one direction, and wherein the control system is further adapted to direct the motor to fix the rotor in a single direction for an extended period of time while both the illumination device and the sensor are operating.

16. The lidar system of claim 15, wherein the illumination device is an infrared LED device, and wherein the sensor is an infrared sensor.

* * * * *